United States Patent [19]

Garcera et al.

[11] Patent Number: 5,062,910
[45] Date of Patent: Nov. 5, 1991

[54] METHOD OF ASSEMBLING A RIGID ELEMENT IN A MODULE, THE ELEMENT HAVING A MEMBRANE FOR SEPARATION, FILTRATION OR CATALYTIC TRANSFORMATION PURPOSES

[75] Inventors: Daniel Garcera, Tarbes; Jacques Gillot, Laloubere, both of France

[73] Assignee: Societe Des Ceramiques Techiques, Bazet, France

[21] Appl. No.: 470,456

[22] Filed: Jan. 26, 1990

[30] Foreign Application Priority Data

Jan. 27, 1989 [FR] France ............... 89 01028

[51] Int. Cl.⁵ .................. B30C 39/10; B32B 18/00
[52] U.S. Cl. .................... 156/82; 156/89; 156/245; 156/267; 156/293; 156/294; 264/60; 264/67; 210/493.2; 210/497.01; 210/506
[58] Field of Search ............ 156/89, 245, 293, 294, 156/267, 153; 264/56, 60, 67; 210/483, 493.2, 497.01, 506

[56] References Cited

U.S. PATENT DOCUMENTS

| | | | |
|---|---|---|---|
| 3,288,615 | 11/1966 | Estes et al. | 210/506 |
| 3,630,794 | 12/1971 | Kirchner | 264/67 |
| 4,696,777 | 9/1987 | Ito | 264/60 |
| 4,786,542 | 11/1988 | Yasuda et al. | 156/89 |
| 4,859,531 | 8/1989 | Tsuji et al. | 156/89 |
| 4,874,516 | 10/1989 | Kondo | 210/497.01 |
| 4,956,089 | 9/1990 | Hurst | 210/493.2 |

FOREIGN PATENT DOCUMENTS

| | | |
|---|---|---|
| 208362 | 4/1960 | Austria . |
| 208363 | 4/1960 | Austria . |
| 271401 | 6/1969 | Austria . |
| 0039537 | 11/1961 | European Pat. Off. . |
| 0092839 | 11/1983 | European Pat. Off. . |
| 0176739 | 4/1986 | European Pat. Off. . |
| 0270051 | 6/1988 | European Pat. Off. . |
| 2019329 | 11/1971 | Fed. Rep. of Germany . |
| 2263554 | 7/1974 | Fed. Rep. of Germany . |
| 2331534 | 6/1977 | France . |

Primary Examiner—Caleb Weston
Attorney, Agent, or Firm—Sughrue, Mion, Zinn Macpeak & Seas

[57] ABSTRACT

A method of assembling a rigid element in a module, the rigid element having a membrane for separation, filtration, or catalytic transformation purposes. The outside shape of the element is substantially cylindrical or prismatic. The element is made from a support of sintered substance, the ends thereof are sealed, and an active layer is deposited thereon. The module is intended to contain at least one rigid element within a shell which is substantially cylindrical about an axis parallel to said rigid element and closed by two end plates having openings to which the ends of the elements are fixed, together with intervening seals. Each of the ends is provided with an extra thickness which is bonded to the support. The extra thickness mass is machined in such a manner as to obtain a shoulder whose outside surface has a predetermined circularly-symmetrical shape about an axis close to that of the element.

17 Claims, 5 Drawing Sheets

METHOD OF ASSEMBLING A RIGID ELEMENT IN A MODULE, THE ELEMENT HAVING A MEMBRANE FOR SEPARATION, FILTRATION OR CATALYTIC TRANSFORMATION PURPOSES

The present invention relates to a method of assembling a rigid element in a module, the element having a membrane for separation, filtration, or catalytic transformation purposes. Such an element, referred to as an "active" element, is substantially cylindrical or prismatic in outside shape and is made of a rigid material such as ceramic, glass, metal, or carbon.

BACKGROUND OF THE INVENTION

In outline, a module comprises a shell, which is generally cylindrical in shape, and which is made of a metal or of a plastic material optionally reinforced with fibers, and in which a plurality of active members are assembled in parallel with one another and with the axis of the shell. Two very stiff end plates provide mechanical support for respective ends of the active elements and hold them in position using intermediate seals. In addition, in a fluid processing installation, the two plates serve to keep separate a region which is upstream from the membrane(s) and a region which is downstream therefrom. The end plates provide sealing between these two regions.

In general, an active element comprises three portions:

a highly porous support with large pores imparting shape and strength to the active element, this portion generally being constituted by a porous sintered material;

a very thin active layer deposited on the surface of the support and serving to provide the separation, filtration, or catalytic transformation function, this active layer covering the inside surface of the, or each, channel through the active element, or, in some cases, when the active elements are tubes, the outside surfaces thereof; it may be deposited directly on the support or else on one or more sublayers themselves directly deposited on the support; and seal which blocks the pores at each end of the support in order to prevent communication between the upstream and downstream regions of the module via the large pores in the support, assuming that the active layer does not cover the entire area of the end of the support. By way of example, this sealing may be provided as described in French patent number 2 560 526.

Multichannel type active elements are described, in particular, in the following publications:

J. Gillot, D. Garcera, "Nouveaux Media Filtrants Céramiques pour Microfiltration Tangentielle et Ultrafiltration", Conférence FILTRA 84 Sté Française de Filtration, October 84, Paris; and J. Gillot, G. Brinkman, D. Garcera, "New Ceramic Filter Media for Crossflow Microfiltration and Ultrafiltration," Fourth World Filtration Congress, Apr. 22-24, 1986, Ostende, Belgium.

Since the supports are made by extrusion, drying, and then sintering, their ends are irregular in shape because of the deformations to which they are subjected during extrusion and then sintering (bending under the effect of gravity, shrinkage at various stages, etc. . . . ). It is therefore difficult to assemble such an element in an end plate while using a standard seal having a geometrically well-defined shape, e.g. an O-ring. The gap between the facing surfaces, i.e. the end of the support and the surface of the end plate, between which the seal is to be received varies too much from one position to another between these facing surfaces.

Attempts may be made to solve this problem by machining each end of the support so as to make it circularly symmetrical. However this has the effect of reducing the thickness of the "skin", i.e. the distance between the outer channels and the outside surface of the support.

The object of the present invention is to avoid these drawbacks and to implement an assembly method making it easier to assemble a set of active elements in the end plates of a module, with optimum sealing.

SUMMARY OF THE INVENTION

The present invention provides a method of assembling a rigid element in a module, the element having a membrane for separation, filtration, or catalytic transformation purposes, the outside shape of the element being substantially cylindrical or prismatic, the method comprising making said element from a support of sintered substance, sealing the ends thereof, and depositing an active layer thereon, said module being intended to contain at least one such rigid element within a shell which is substantially cylindrical about an axis parallel to said rigid element and closed by two end plates having openings to which the ends of said elements are fixed together with intervening seals, each of said ends being provided with an extra thickness which is bonded to said support, wherein said extra thickness is machined in such a manner as to obtain a shoulder whose outside surface has a predetermined circularly-symmetrical shape about an axis close to that of said element.

It is then easy to assemble the said end in said corresponding opening in the end plate by means of a seal provided in advance, such as a seal which is toroidal, cylindrical, flat, conical, etc.

In a variant, the seal is made by brazing on an end piece to the support, and then bonding (e.g. welding or brazing) the periphery of the end piece to the end plate. The active element is thus fixed to the end plate in a manner capable of withstanding high temperatures. In such applications, a metal bellows may be incorporated in the end piece or may be associated therewith.

Said shoulder and said substance of said support are selected from: ceramic, glass, metal, and carbon.

The shoulder is advantageously made of the same material as the support portion of the active element, e.g. alumina when the support is made of alumina or sintered stainless steel when the support is made of stainless steel, or else sintered porous glass when the support is made of porous glass. This ensures that sintering provides a good bond between the support and the shoulder and it avoids any problem of differential expansion. However, it is also possible to use a ceramic shoulder on a glass support or a glass shoulder on a ceramic support.

It is also possible to use carbon when the support is made of porous carbon. In this case, an extra thickness is deposited on the support in the form of a mixture of particles of carbon and a carbonizable binder such as coal pitch, or a phenol resin, and the binder is carbonized in a non-oxidizing atmosphere in order to obtain a carbon shoulder which may optionally be porous.

However, the shoulder may also be constituted by any substance capable of binding well with a support made of ceramic, glass, metal, or carbon, e.g. a polymer.

In this case a resin (e.g. an epoxy resin optionally containing a mineral filler) is cast around the end of the element so that the resin then constitutes the excess thickness and also impregnates the pores in the end of the support.

The operation of depositing the substance constituting the extra thickness may be performed in various different ways, e.g. by casting, by molding, or by spraying.

When casting, the starting material is a slip or suspension containing:

for a support made of ceramic or glass:
a ceramic or glass powder;
an organic binder providing dry cohesion; and
a solvent for the binder (generally water);
for a carbon support:
carbon powder; and
a carbonizable organic substance (pitch, phenol resin, etc. . . . ) which is liquid or in solution in a solvent;
for a support made of metal:
a metal powder; and
a liquid for putting the powder into suspension.

For molding around the end of the active element, the starting material is a plastic mass similar in composition to one of the compositions mentioned above for casting, but less rich in liquid.

For spraying (e.g. using a spray gun) the starting material is a slip similar to the slip described above.

In all three of the above methods, the extra thickness is subsequently consolidated by drying and sintering, or when using a carbonizable substance by heating to between 800° C. and 1500° C. in a non-oxidizing atmosphere.

It is also possible to deposit the materials constituting the extra thickness around the end of the active element by using a plastic mass containing a polymerizable plastic substance and a mineral filler. For example, if the support is made of porous alumina, then the plastic mass may be constituted by a mixture of epoxy resin and alumina powder. The extra thickness is subsequently consolidated by polymerization.

Finally, flame or plasma spraying of molten material (ceramic, glass, metal) may also be used.

In a preferred implementation, an active element is made using the following stages:

a substance suitable for sintering is extruded, in order to constitute the support;

it is dried and optionally subjected to a first baking operation;

an extra thickness of a substance capable of being sintered or carbonized in part and referred to below as a "shoulder" when machined is then deposited on the lateral outside surface of the support over a short length from the end of the support and all the way around the support;

this deposit is then dried and consolidated by sintering or by carbonization if it contains a carbonizable binder (the sintering or the carbonization may be performed in the same baking operation as is used for sintering the support), the support and its extra thickness then have an outside surface which is irregular in shape;

the outside surface of the extra thickness carried at each end of the support is then machined, e.g. by using a lathe, or a grinder, etc., so as to form respective shoulders;

each end of the support together with its shoulder is sealed, and depending on the type of sealing used, this operation may take place either before the shoulder is machined or after, and if the sealing is performed after machining then the sealing process must form a layer of negligible or at least very uniform thickness on the surface of the shoulder so as to avoid destroying the regularity of the shape of the outside surface of the shoulder; and the active layer is deposited, which operation may be performed either before or after the operation of sealing, depending on circumstances.

The assembly method of the invention has the following advantages in particular:

the shoulder requires only a small amount of additional material relative to the element as extruded and sintered;

making the shoulder gives rise to only a small additional cost; when the support portion of the active element is sintered in two baking stages at different temperatures, the extra thickness may be deposited after the first baking stage and may subsequently be sintered during the second baking stage; and when using a support having multichannel geometry, it is often advantageous to make the support in the form of a hexagonal prism containing 7, 19, or 37 channels, for example, disposed in a compact and regular disposition, however it then becomes difficult to perform assembly by means of preformed seal such as an O-ring or a sealing gland. Providing a shoulder makes it possible to use seals of these types.

BRIEF DESCRIPTION OF THE DRAWINGS

Embodiments of the invention are described by way of example with reference to the accompanying drawings, in which.

DETAILED DESCRIPTION

Example I

Figure 1:
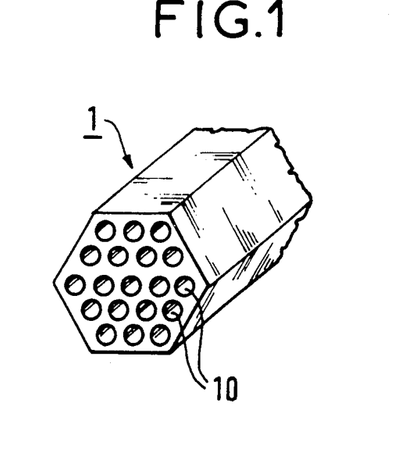
FIG. 1 is a diagrammatic view of the end of a hexagonal support for a multichannel active element having nineteen channels, prior to the shoulder being deposited thereon.

The method began with a multichannel alumina support 1 having nineteen channels 10, with FIG. 1 showing one end of the support.

After final sintering, it was in the form of a hexagonal prism of length 850 mm and of width between flats of about 28 mm. The edges of the hexagon were rounded giving a maximum transverse dimension (between vertices) of 30 mm. The support was made of porous alumina having a pore diameter of 12 μm and a porosity of 35% by volume. It suffered from the following imperfections in shape:

the distance between opposite faces of the hexagonal prism at the ends of the element lay somewhere in the range 27 mm to 29 mm; and one of the ends of the multichannel element was not exactly rectilinear but was slightly curved (drooping defect). At this end of the element, the axis of the hexagonal prism was at an angle relative to the mean axis as determined over the entire length of the element lying in the range 1° to 2°, depending on the element in question.

In order to add the excess thickness, a slip was prepared having the following composition by weight:
alumina having a mean grain size of 13 μm: 15%;
alumina having a mean grain size of 30 μm: 45%;
alumina having a mean grain size of 2.5 μm: 20%;
water: 18%;
concentrated suspension of a vinyl acetate latex: 1.96%;
Darvan C surface tension agent (manufactured by Vanderbilt): 0.04%

Figure 2:
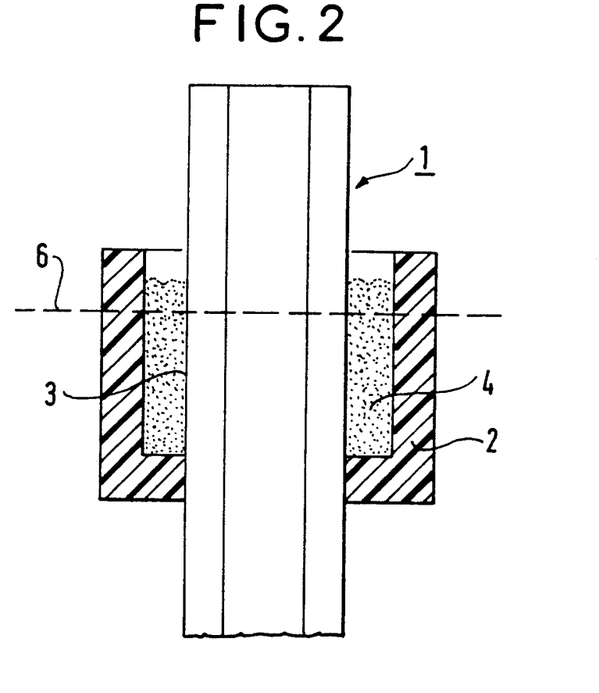
FIG. 2 is a diagrammatic longitudinal section showing the stage during which the extra thickness is deposited on one of the ends of the FIG. 1 support.

In order to deposit the extra thickness on the support which had already been subjected to a first baking operation, the end of the support was placed vertically in a rubber mold 2 which adapted to the irregular shape of the end 3 (see FIG. 2). The slip was cast or deposited into the space between the support and the mold. The slip liquid was sucked by capillarity into the pores of the porous support 1 and it formed a cake 4 about the support 1 which was then dried. It was then unmolded. The cake 4 continues to adhere to the support 1. The same process was applied to the other end of the support 1. The support and the extra thickness 5 were subjected to final sintering by baking at 1750° C. The extra thickness obtained in this way was porous, very strong, and very well bonded to the support.

As shown in FIG. 2, the end of the support was cut on a plane 6 extending perpendicularly to the axis of the support.

Figure 3:
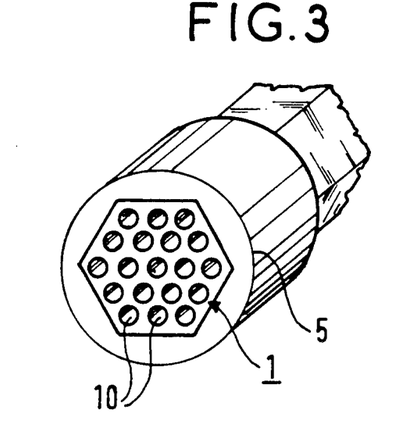
FIG. 3 is a view analogous to FIG. 1, but showing the support provided with extra thickness in accordance with the invention.
Figure 4:
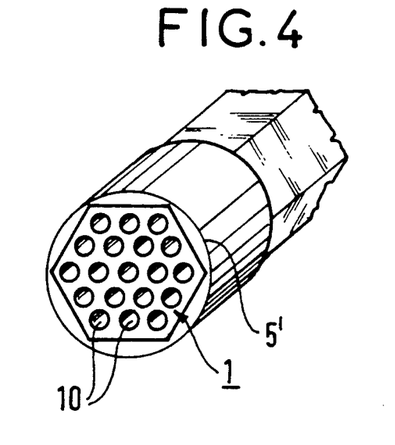
FIG. 4 is a view analogous to FIG. 3 showing the support and its shoulder after machining in accordance with the invention.

Thereafter the outside surface of the extra thickness 5 was ground (see FIG. 3) so as to form a cylindrical shoulder 5 which is cylindrical or one which is cylindro-conical in shape, at 5' (see FIG. 4). Such a shoulder is accurately dimensioned, having an outside diameter of 34 mm and a length of 18 mm.

The end of the support was sealed by impregnating it with a glass which, on melting, penetrated fully into the pores of the support so as to leave no extra thickness on the axial end surface of the shoulder 5'. The active layer was deposited on the inside surfaces of the channels.

This provided an active element whose end was geometrically well-defined in shape and was therefore well-adapted to being assembled in a module by means of sealing rings or gland-type seals.

Example II

The method of the invention was applied to a porous glass support having pores with a diameter of 10 μm and in the form of a tube that was approximately cylindrical in shape, with an inside diameter of about 15 mm, an outside diameter of about 19 mm, a length of 500 mm, and obtained by sintering a glass powder.

This tube suffered from the following imperfections in shape:

the outside diameter of its section at each end was approximately in the form of a nearly circular ellipse (ovalization defect) with the dimensions of the main axes being as follows:
at an end A: 18.3 mm and 18.9 mm; and
at the other end B: 18.7 mm and 19.7 mm; and
its average outside diameter was therefore 18.6 mm at the end A and 19.2 mm at the end B (conical defect).

A slip was prepared having the following composition by weight:
glass powder having an average grain size of 8 μm: 24%
glass powder having an average grain size of 20 μm: 44%
water: 30%
polyvinyl alcohol: 2%

The composition of the selected glass powder gave the same coefficient of expansion as the glass constituting the tube, but its softening point was 50° C. lower.

As in Example I, extra thickness was deposited around each end of the tube using the above-specified slip. The extra thickness was consolidated by heat treatment to a temperature of 50° C. less than the temperature used for making the tube.

The extra thicknesses at the ends of the tube were then ground to obtain shoulders having an outside diameter of 22 mm and a length of 10 mm. After the pores at the ends of the support had been sealed, an active element was obtained suitable for mounting in a module by means of sealing rings or gland-type seals. Such an element is suitable for having a filter layer with a pore diameter smaller than that of the support deposited on the inside surface of the tube.

Example III

The invention of the method was applied to a porous sintered stainless steel support having a mean pore diameter of 15 μm, the support being in the form of a tube of length 1000 mm, of inside diameter of about 18 mm, and of outside diameter about 24 mm, said outside diameter varying between 23.5 mm and 24.5 mm (ovalization defect).

A shoulder was made on said support by preparing a slip having the following composition by weight:
stainless steel powder having the same composition as the tube and a mean particle diameter of 15 μm: 85%
water: 14.5%
polyvinyl alcohol: 0.5%

An extra thickness of stainless steel powder was sprayed on to each end of the tube using this slip and a spray gun. Spray area delimiting masks were used to limit the length of the extra thickness to 20 mm. The deposited substance was consolidated by sintering at the same temperature as was used for sintering the tube.

Thereafter each end was turned to obtain a shoulder having an outside diameter of 27 mm and a length of 20 mm.

The pores at the ends of the tube were sealed by infiltrating a brazing composition. A thin layer of stainless steel powder was deposited on the inside surface of the tube and sintered so as to obtain a separating layer having a pore diameter of 1 μm.

The resulting active element was suitable for assembling in a module by means of sealing rings or gland-type seals.

Example IV

The method of the invention was applied to a carbon support. The idea was to provide a shoulder on a support of porous carbon, having a mean pore diameter of 10 μm, and substantially in the form of a cylinder that was 600 mm long and pierced by seven parallel channels each having a diameter of 5 mm (i.e. a multichannel type element). The diameter thereof fluctuated between 21.5 mm and 22.5 mm.

To do this, a mixture was prepared comprising 60% by volume of carbon powder having a mean particle diameter of 15 μm, together with 40% by volume of coal pitch. This mixture was heated to 160° C. in order to obtain a paste. The paste was molded around each end of the support to obtain an extra thickness of about 3 mm. The element was heated progressively up to 1200° C. in a non-oxidizing atmosphere in order to carbonize the pitch.

Thereafter the extra thickness was ground to form a cylindrical shoulder having a diameter of 25 mm and a length of 15 mm. The ends were sealed by being impregnated with liquid pitch and by carbonizing it. Thereafter, a slip constituted by carbon powder, phenol resin, and a resin solvent was filtered through the support in order to deposit a thin layer of carbon and resin on the inside surface of each of the channels, after which the layer was consolidated by carbonizing the resin in a non-oxidizing atmosphere so as to obtain a layer of carbon having a mean pore diameter of 0.2 μm.

A multichannel active element was thus obtained suitable for being mounted by means of sealing rings or gland-type seals, for example.

Example V

The same type of metal tubular support was used as in Example III, and an extra thickness of stainless steel having the same composition as that of the support was deposited thereon by flame spraying molten metal (Schoop process). The spray zone was delimited by means of masks to ensure that the length of the extra thickness was limited to 15 mm.

This extra thickness was then turned to obtain a shoulder analogous to that of Example III, after which the procedure was identical for sealing its ends, depositing a filter layer, and mounting it in a module. Instead of being turned, it could equally well have been ground.

Example VI

Using a multichannel alumina support of the same type as in Example I, a cylindrical extra thickness was formed by molding a mixture having the following composition by weight:
epoxy resin: 50%
quartz powder having a mean particle diameter of 2 μm: 50%

After the epoxy resin has been polymerized, a cylindrical shoulder having a diameter of 34 mm and a length of 18 mm was obtained by turning. After sealing and depositing a filter layer, the active element was mounted in a module using sealing rings.

Figure 5:
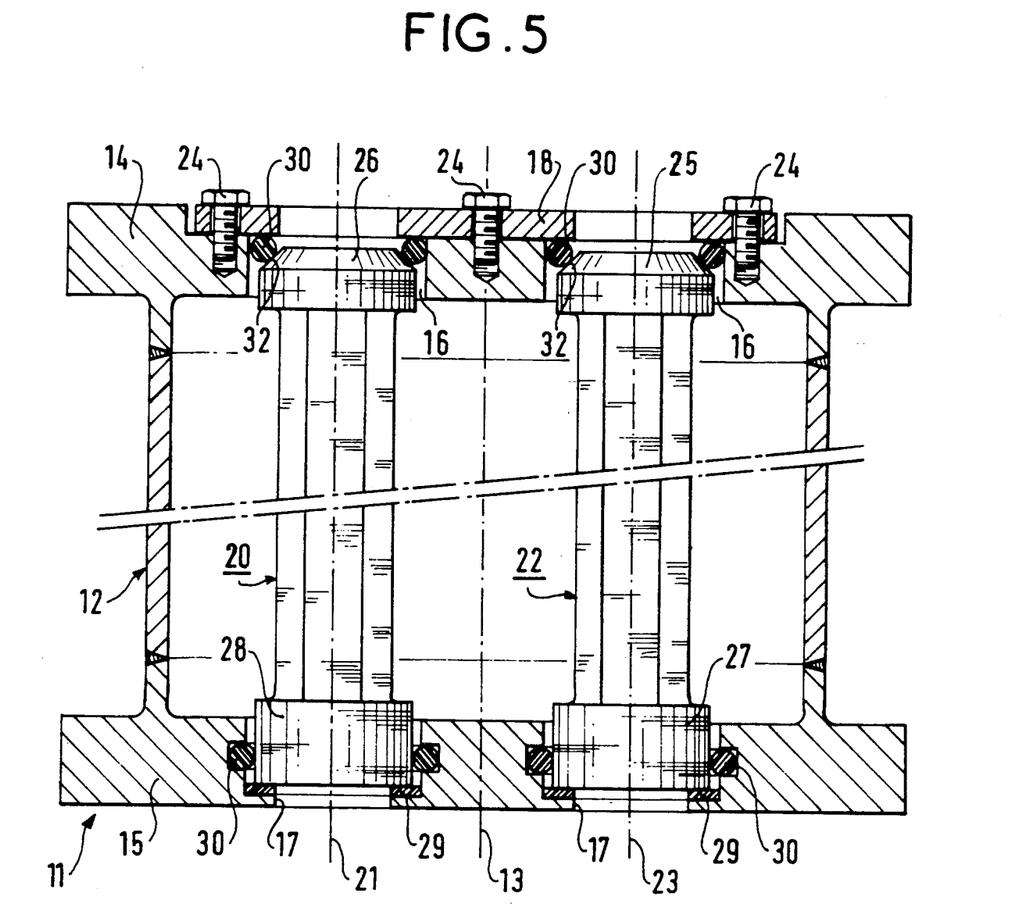
FIG. 5 is a diagrammatic longitudinal section through a module 11 in accordance with the invention.

Active elements as described above may be mounted in modules in the manner shown in FIG. 5, for example.

The module 11 comprises a metal shell 12 which is generally cylindrical about an axis 13 and which is closed by two end plates 14 and 15 extending orthogonally to the axis 13 and having respective openings 16 and 17.

Active elements 20 and 22 having respective axes 21 and 23 have their ends prepared for being received in the openings 16 and 17. The ends of the element 20 have shoulders 26 and 28 in accordance with the invention and the ends of the element 22 have shoulders 25 and 27 in accordance with the invention.

The shoulders 27 and 28 bear against collars provided in the end plate 15 via intermediate abutment washers 29. O-rings 30 are received in the plate 15 and provide good sealing.

The shoulders 25 and 26 are terminated by truncated cones 32 and these engage O-rings 30 which are received in the openings 16 and which are locked in place longitudinally by a retaining plate 18 fixed on the end plate 14 by means of screws 24.

Figure 6:
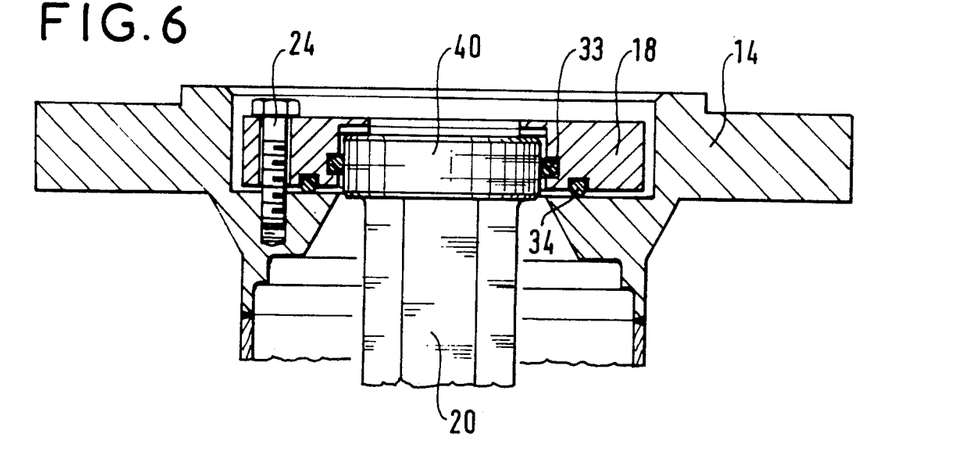
FIG. 6 is a diagrammatic view on a larger scale showing one end of an active element in a module of the invention.
Figure 7:
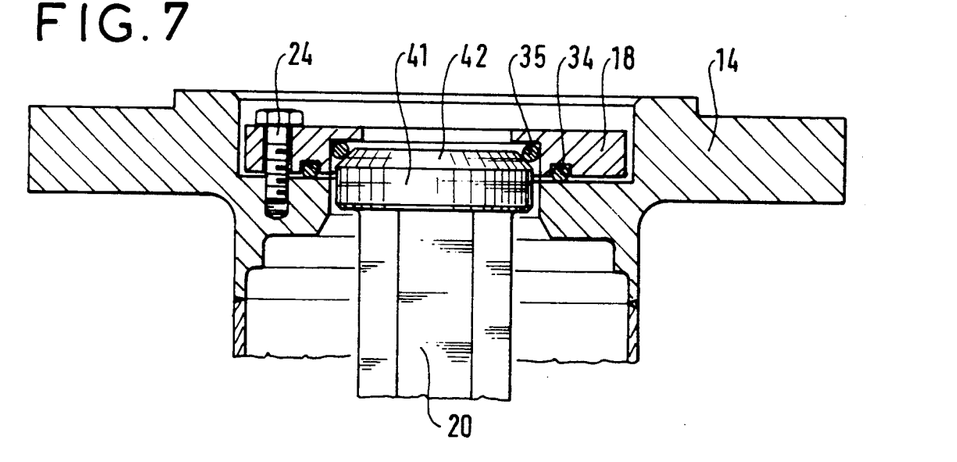
FIGS. 7 and 8 show variant dispositions analogous to FIG. 6 using different types of seal.
Figure 8:
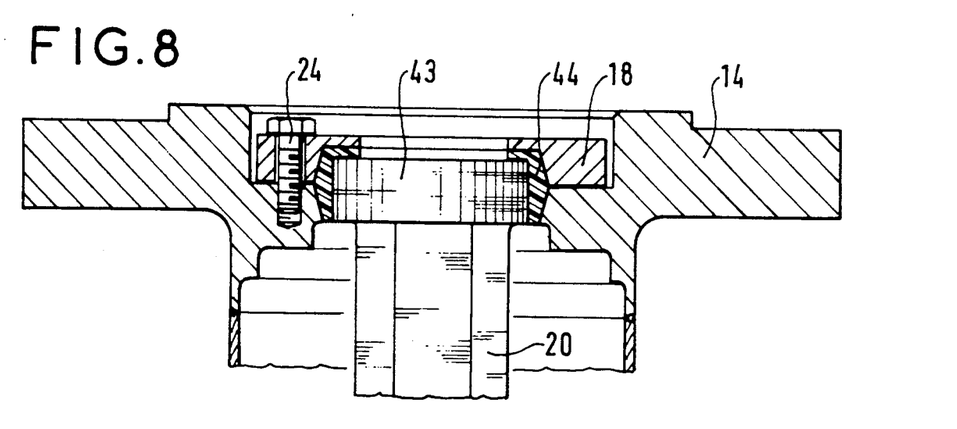

FIGS. 6 to 8 show three variants of dismountable seals made of elastomer and suitable for co-operating with shoulders of the invention. All three of these figures show an end plate 14, a retaining plate 18, and an active element 20.

In FIG. 6, the active element 20 has a cylindrical shoulder 40 co-operating with an O-ring 33 received in a cavity in the retaining plate 18. An additional O-ring 34 is provided between the plates 14 and 18.

In FIG. 7, the active element 20 has a shoulder 41 terminating in a truncated cone 42. The truncated cone cooperates with an O-ring 35 engaged in the retaining plate 18. An O-ring 34 is provided as in FIG. 6.

In FIG. 8, the element 20 has a cylindrical shoulder 43 surrounded over all of its cylindrical face and over a fraction of its plane face by a seal 44.

Figure 9:
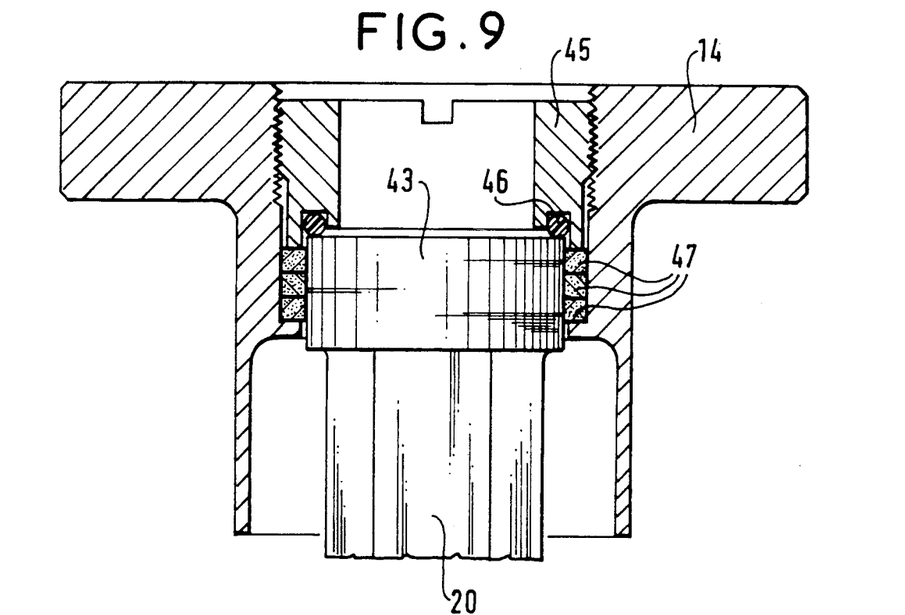
FIG. 9 is a view analogous to FIG. 6 showing a disposition using a gland type seal, i.e. a seal in which sealing is obtained by deformable material constituted at least in part by fibers, which material is compressed between or against the two pieces between which sealing is to be obtained.

FIG. 9 shows a variant using a gland type seal. The shoulder 43 is received in the end plate 14 and co-operates with seals 47 made of asbestos fibers or braids of graphite fibers, together with an O-ring 46, all of which are held pressed in place by means of a part 45 which is screwed into the end plate 14.

Figure 10:
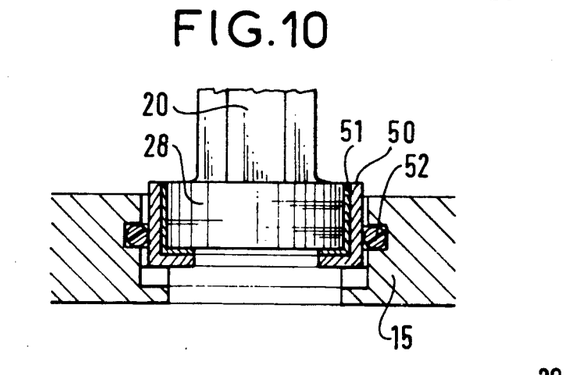
FIG. 10 shows a variant implementation of one end of an element in accordance with the invention having a brazed end piece.

In FIG. 10, the machined outside surface of the shoulder 28 has an end piece 50 applied thereto, with the end piece being made of metal, for example, and having an inside shape which is very close to the outside shape of the machined shoulder. The end piece is fixed on the shoulder by glue 51, by brazing, by cement, by molten glass, or by a carbonized organic material. Fixing is possible because the two facing surfaces are very close to each other, and this would not be true if the shoulder were not machined. The active element 20 is then assembled in the module 11 by means of a removable sealing ring 52 situated between the outside surface of the end piece 50 and the inside surface of the hole through the end plate 15.

Figure 11:
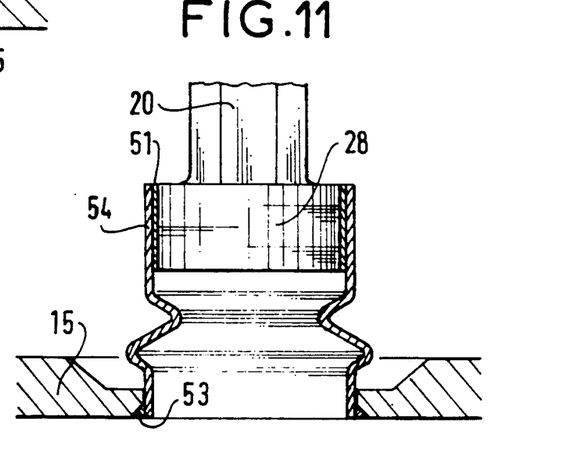
FIG. 11 shows a variant embodiment of one end of an element of the invention having a bellows-forming end piece.

In FIG. 11, the end piece 54 is in the form of a bellows and is fixed to the shoulder 28 of the active element 20 by means of an element 51 made of the same substance as the end piece 50 (cf. FIG. 10). The other end of the bellows is welded at 53 to the end plate 15.

Figure 12:
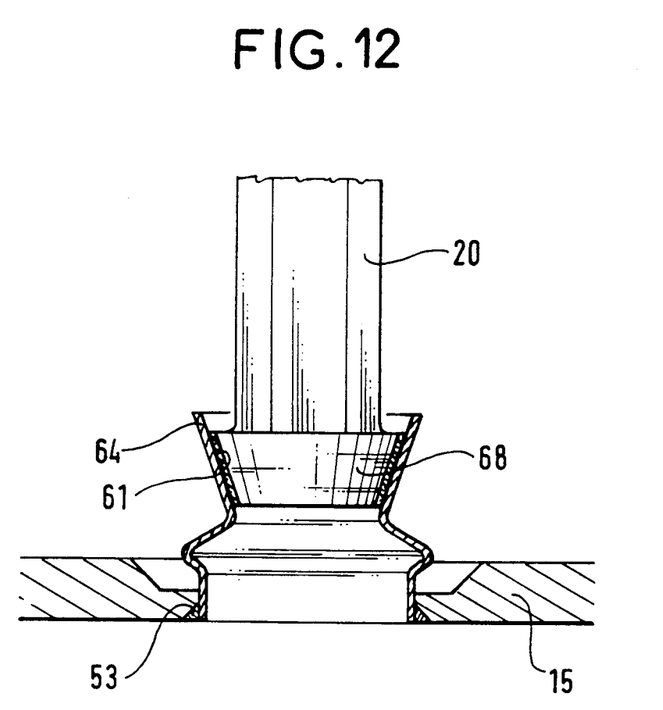
FIG. 12 shows a variant embodiment of one end of an element in accordance with the invention having a bellows-forming end piece.

In the variant of FIG. 12, the shoulder 68 of the active element 20 is machined into the shape of a truncated cone. This shoulder is fixed to an end piece 64 in the form of a bellows by means of molten glass 61.

Naturally the invention is not limited to the various embodiments described and shown. The term "braze" is used to include soldering with any appropriate alloy (not necessarily brass). Without going beyond the scope of the invention, any means may be replaced by an equivalent means.

We claim:

1. In a method of assembling a rigid element in a module, the rigid element having a membrane for separation, filtration, or catalytic transformation purposes and having a substantially cylindrical or prismatic exterior shape, said method comprising forming a support of a sintered material, sealing the ends of said support and depositing an active layer on said support to form said rigid element, and wherein said module contains at least one such rigid element in a substantially cylindrical envelope having an axis parallel to said rigid element and fixed by two end plates having openings and where the ends of element are subsequently fixed to the end plates together with intervening seals, the improvement comprising:

prior to assembling said rigid element in said module depositing an excess thickness on said ends and machining said excess thickness at each end to produce a shoulder whose outside surface has a predetermined circularly-symmetrical shape about an axis substantially coaxial with the axis of said support.

2. A method of assembly according to claim 1, wherein said shoulder and said support are of a substance selected from the group consisting of: ceramic, glass, metal, and carbon.

3. A method of assembly according to claim 2, wherein the substance of said shoulder and the substance of said support are identical.

4. A method of assembly according to claim 1, wherein said extra thickness is obtained by depositing a substance onto said support prior to sealing its ends and depositing said active layer.

5. A method of assembly according to claim 4, wherein a slip of a powder of glass or ceramic, an organic binder providing dry cohesion, and a solvent for the binder is deposited onto said support at its ends, and said method further comprises the step of drying said slip and sintering said powder of glass or ceramic.

6. A method of assembly according to claim 4, wherein a suspension comprising carbon powder and a carbonizable organic substance as a liquid or a solution in a solvent is deposited onto the ends of a carbon support, and said method further comprises drying said deposit and heating said deposit to between 800° C. and 1500° C., in a non-oxidizing atmosphere.

7. A method of assembly according to claim 4, wherein a suspension containing metal in powder form is desposited on a metal support and said method further comprises drying said suspension and sintering said metal.

8. A method of assembly according to claim 5, wherein said support is in a presintered state, and said support is sintered simultaneously with the sintering of said extra thickness.

9. A method of assembly according to claim 7, wherein said support is in a presintered state, and said support is sintered simultaneously with the sintering of said extra thickness.

10. A method of assembly according to claim 4, wherein the step of depositing of said extra thickness about the ends of said support comprises molding a plastic mass similar in composition to that of the slip, but less rich in liquid, about said support ends.

11. A method of assembly according to claim 4, wherein the step of depositing of said extra thickness comprises spraying said extra thickness mass about the ends of said support.

12. A method of assembly according to claim 1, wherein said extra thickness is a polymerizable plastic substance molded around the ends of said support, and said method further comprises polymerizing said plastic substance to consolidate said extra thickness.

13. A method of assembly according to claim 2, wherein a substance selected from the group consisting of: ceramic, glass, and metal is flame sprayed or plasma sprayed onto the ends of the support.

14. A method of assembly according to claim 1, further comprising the steps of applying an end piece to said shoulder having an inside shape very close to the outside shape of the shoulder, and fixing the end piece onto the shoulder by means of a substance selected from the group consisting of: a glue, a solder, a braze, a cement, molten glass, and a carbonized organic substance.

15. A method of assembly according to claim 14, wherein said end piece is made of metal and is soldered, brazed, or welded to the corresponding end plate.

16. A method of assembly according to claim 14, wherein said end piece comprises a metal bellows.

17. A method according to claim 1, wherein said extra thickness is a polymerizable plastic substance containing a mineral filler molded around the ends of said support, and said method further comprises polymerizing said plastic substance to consolidate said extra thickness.

* * * * *